US011017919B2

(12) United States Patent
Gautschi et al.

(10) Patent No.: US 11,017,919 B2
(45) Date of Patent: May 25, 2021

(54) MEDIUM-VOLTAGE OR HIGH-VOLTAGE ELECTRICAL DEVICE HAVING LOW-THICKNESS HYBRID INSULATION

(71) Applicant: General Electric Technology GmbH, Baden (CH)

(72) Inventors: David Gautschi, Leutwil (CH); Robert Luescher, Seon (CH); Yannick Kieffel, Saint-Jean-de-Bournay (FR); François Biquez, Pugny-Chatenod (FR)

(73) Assignee: General Electric Technology GmbH, Baden (CH)

( * ) Notice: Subject to any disclaimer, the term of this patent is extended or adjusted under 35 U.S.C. 154(b) by 0 days.

(21) Appl. No.: 16/066,380

(22) PCT Filed: Dec. 28, 2016

(86) PCT No.: PCT/EP2016/082776
§ 371 (c)(1),
(2) Date: Jun. 27, 2018

(87) PCT Pub. No.: WO2017/114862
PCT Pub. Date: Jul. 6, 2017

(65) Prior Publication Data
US 2019/0156968 A1  May 23, 2019

(30) Foreign Application Priority Data

Dec. 28, 2015  (EP) .................................... 15307151

(51) Int. Cl.
| | | |
|---|---|---|
| *H01B 3/56* | (2006.01) | |
| *H01H 33/22* | (2006.01) | |
| *H02B 13/055* | (2006.01) | |
| *H01B 3/40* | (2006.01) | |
| *H01B 7/282* | (2006.01) | |
| *H01B 3/10* | (2006.01) | |
| *H01H 33/56* | (2006.01) | |

(52) U.S. Cl.
CPC .............. *H01B 3/56* (2013.01); *H01B 3/105* (2013.01); *H01B 3/40* (2013.01); *H01B 7/2825* (2013.01); *H01H 33/22* (2013.01); *H02B 13/055* (2013.01); *H01H 2033/566* (2013.01)

(58) Field of Classification Search
None
See application file for complete search history.

(56) References Cited

U.S. PATENT DOCUMENTS

| | | | | |
|---|---|---|---|---|
| 3,487,349 A * | 12/1969 | Halloran | ................ | C08K 13/06 106/18.11 |
| 7,742,283 B2 * | 6/2010 | Hama | ..................... | H01H 33/24 200/48 R |
| 7,848,084 B2 * | 12/2010 | Hama | ..................... | H01H 33/24 200/48 R |
| 8,657,413 B2 * | 2/2014 | Graham | ............... | C08K 5/5415 156/329 |
| 9,275,775 B2 * | 3/2016 | Bjorklund | .............. | H01B 3/302 |
| 9,349,501 B2 * | 5/2016 | Miyamoto | ............ | H01H 33/64 |
| 9,589,699 B2 * | 3/2017 | Groppel | ................. | B82Y 30/00 |
| 9,837,801 B2 * | 12/2017 | Kieffel | ..................... | H01B 3/56 |
| 9,899,125 B2 * | 2/2018 | Kieffel | ..................... | H01B 3/56 |
| 9,984,796 B2 * | 5/2018 | Groppel | ................. | B82Y 30/00 |
| 10,211,617 B2 * | 2/2019 | Buche | ...................... | H01R 4/56 |
| 2013/0178584 A1 * | 7/2013 | Jin | ..................... | C08G 59/4223 524/601 |
| 2014/0326481 A1 * | 11/2014 | Groppel | ................. | B82Y 30/00 174/120 C |
| 2015/0083979 A1 * | 3/2015 | Costello | .................. | H01B 3/24 252/571 |
| 2016/0024348 A1 * | 1/2016 | Kim | ..................... | C09D 183/06 428/412 |
| 2017/0162349 A1 * | 6/2017 | Girodet | ................... | C01B 13/02 |
| 2017/0352509 A1 | 12/2017 | Biquez | | |
| 2018/0040391 A1 | 2/2018 | Kieffel et al. | | |
| 2018/0197656 A1 * | 7/2018 | Biquez | ..................... | H01B 3/56 |
| 2018/0286530 A1 * | 10/2018 | Costello | .................. | H01B 3/24 |
| 2018/0315520 A1 * | 11/2018 | Izcara Zurro | ......... | H01B 3/002 |
| 2018/0358148 A1 * | 12/2018 | Kieffel | ................. | H01H 33/562 |

FOREIGN PATENT DOCUMENTS

| | | |
|---|---|---|
| CN | 1897377 A | 1/2007 |
| CN | 103946928 A | 7/2014 |
| CN | 104081606 A | 10/2014 |
| CN | 104798274 A | 7/2015 |

(Continued)

OTHER PUBLICATIONS

Military Specification MIL-A-8625F, Anodic Coatings for Aluminum and Aluminum Alloys, Sep. 10, 1993 (Year: 1993).*
U.S. Appl. No. 15/580,981 entitled "Gas-Insulated Electrical Apparatus Filled With a Dielectric Gas" filed Dec. 8, 2017.
U.S. Appl. No. 15/778,538 entitled Method and Facility for Filling a Gas-Insulated Electrical Apparatus Comprising a Mixture of (CF3)2CFCN and CO2 filed May 23, 2018.
European Preliminary Search Report for EP 15 30 7151 dated Jun. 1, 2016.
International Search Report for PCT/EP2016/082776 dated Mar. 23, 2017.
International Preliminary Report on Patentability dated Apr. 4, 2018.
Chinese Office Action dated Jul. 13, 2020 for Patent Application 201680076703.X.

*Primary Examiner* — Robert J Hoffberg
(74) *Attorney, Agent, or Firm* — Eversheds Sutherland (US) LLP

(57) ABSTRACT

A medium-voltage or high-voltage electrical device comprising a sealed enclosure in which are located electrical components covered with a solid dielectric layer and a gaseous medium ensuring electrical insulation and/or extinguishing electrical arcs, the gaseous medium comprising heptafluoroisobutyronitrile and a dilution gas, the thickness of the solid dielectric layer being less than 1 mm and being produced from a material comprising a polyepoxide or polyurethane resin optionally containing a filler or aluminum oxide.

12 Claims, No Drawings

(56) References Cited

FOREIGN PATENT DOCUMENTS

| | | | |
|---|---|---|---|
| CN | 107541013 A | * | 1/2018 |
| EP | 1359197 A1 | | 5/2003 |
| EP | 21316692 A1 | | 12/2014 |
| FR | 2986102 A1 | | 7/2013 |
| FR | 2986103 A1 | | 7/2013 |
| FR | 3016746 A1 | | 7/2015 |
| JP | 2001284138 A | | 10/2001 |
| WO | 2010139906 A1 | | 12/2010 |
| WO | 2013151741 A1 | | 10/2013 |
| WO | 2014037566 A1 | | 3/2014 |
| WO | 2015040069 A1 | | 3/2015 |

* cited by examiner

MEDIUM-VOLTAGE OR HIGH-VOLTAGE ELECTRICAL DEVICE HAVING LOW-THICKNESS HYBRID INSULATION

CROSS-REFERENCE TO RELATED APPLICATIONS

This is a National Stage application of PCT international application PCT/EP2016/082776, filed on Dec. 28, 2016, which claims the priority of European Patent Application No. 15 307 151.9 filed Dec. 28, 2015, both of which are incorporated herein by reference in their entirety.

TECHNICAL FIELD

The invention relates to the field of electrical insulation and electric arc extinction in medium- or high-voltage electrical device, in particular in high-voltage electrical device.

More particularly, the present invention relates to the use in medium- or high-voltage equipment of a hybrid insulation system having low environmental impact based on the combination of a gaseous medium comprising heptafluoroisobutyronitrile in a mixture with a dilution gas used as a gas for electrical insulation and/or for electric arc extinction together with a solid insulation of the aluminum oxide and/or epoxy resin or polyurethane resin optionally type possibly with a filler, which solid insulation is applied in a thin layer on the conductive parts that are subjected to an electric field that is greater than the breakdown field of the system without solid insulation.

The invention also relates to medium- or high-voltage equipment in which electric arc extinction is performed by a gaseous medium comprising heptafluoroisobutyronitrile in a mixture with a dilution gas, and electrical insulation is provided by the same gaseous medium in combination with solid insulation of low dielectric permittivity of the anionic oxidation and/or polyepoxide or polyurethane paint type optionally with a nanometric filler, which solid insulation is applied in a layer of small thickness on the conductive parts that are subjected to an electric field that is greater than the breakdown field of the system without solid insulation. This equipment may in particular be an electrical transformer such as a power or measurement transformer, a gas-insulated transmission line (GIL) for transporting or distributing electricity, a set of busbars, or even electrical connector/disconnectors (also called switchgear), such as a circuit breaker, a switch, a unit combining a switch with fuses, a disconnector, a grounding switch, or a contactor.

STATE OF THE PRIOR ART

In medium- or high-voltage substation equipment, electrical insulation and, if necessary, electric arc extinction are typically performed by a gas that is confined to the inside of said equipment.

Currently, sulfur hexafluoride ($SF_6$) is the gas used most frequently. That gas presents dielectric strength that is relatively high, good thermal conductivity, and low dielectric losses. It is chemically inert, non-toxic for humans and animals and, after being dissociated by an electric arc, it recombines quickly and almost completely. In addition, it is non-flammable and its price is still moderate.

However, $SF_6$ has the main drawback of presenting a global warming potential (GWP) of 23,500 (relative to $CO_2$ over 100 years) and remains in the atmosphere for a time period of 3200 years, and this places it among gases having a strong global warming effect. $SF_6$ was therefore included in the Kyoto protocol (1997) in the list of gases for which emissions need to be limited.

The best way to limit emissions of $SF_6$ consists in limiting the use of said gas, and this has led manufacturers to look for alternatives to $SF_6$.

To this end, a new gas presenting electric insulation properties that are sufficient for application in the field of the high- or medium-voltage equipment has been developed. More precisely, that gas is a mixture of two molecules, one of which is present in great majority and the second is heptafluoroisobutyronitrile, present in smaller amounts. That gas mixture has the advantage of being based on an alternative to $SF_6$ presenting a GWP that is lower than $SF_6$ in a solution with a host gas or dilution gas having a very low GWP, such as carbon dioxide ($CO_2$), which has a GWP that is equal to 1, or having a GWP of zero such as nitrogen ($N_2$) or air.

International application WO 2014/037566 [1] describes the use of such mixtures as insulation gas in high- or medium-voltage equipment, in association with solid insulation. International application WO 2015/040069 [2] describes a particular insulation gas, namely comprising heptafluoroisobutyronitrile, carbon dioxide, and oxygen, oxygen being present in said gaseous medium in a molar percentage lying in the range 1% to 25%.

In both documents, the thickness of the insulating layer, when said layer is present, is a function of the utilization factor of the electric field $\eta$, defined as the ratio of the mean electric field (U/d) divided by the (maximum electric field, Emax ($\eta = U/(Emax \cdot d)$). Thus, the layer is thick for utilization factors close to 0.3, i.e. lying in the range 0.2 to 0.4 and the layer is thin or fine for utilization factors approaching 0.9, i.e. greater than 0.5 and in particular greater than 0.6. In addition, a thick layer is defined as a layer lying in the range 1 millimeter (mm) to 10 mm, whereas a thin or fine layer is less than 1 mm, in particular less than 500 micrometers ($\mu m$) and typically lies between 60 $\mu m$ and 100 $\mu m$.

In view of the above, the inventors have therefore generally sought to further improve hybrid insulation systems for high- or medium-voltage equipment using, as insulation gas, a gaseous medium comprising heptafluoroisobutyronitrile while maintaining equipment characteristics close to those of $SF_6$, from the point of view of its insulating and extinguishing abilities, and without significantly increasing the size of the equipment or the pressure of the gas inside it.

In addition, the inventors have sought to maintain the service temperature ranges of the equipment close to those of equivalent $SF_6$ equipment, and to do so without external heater means.

They have further sought to provide improved hybrid insulation systems for high- or medium-voltage equipment, using, as insulating gas, a gaseous medium comprising heptafluoroisobutyronitrile having a manufacture or purchase cost that is compatible with use on an industrial scale.

They have further sought to provide medium- or high-voltage equipment based on said improved insulation system having size and pressure that are close to those of equivalent equipment insulated with $SF_6$ and that does not present liquefaction at the minimum utilization temperature without the addition of an external heat source.

SUMMARY OF THE INVENTION

The aims that have been set, and others, are achieved by the invention which proposes the use of a particular hybrid insulation system making it possible to obtain medium- or high-voltage equipment having low environmental impact.

Indeed, the hybrid insulation system implemented in the present invention is based on a gaseous medium comprising heptafluoroisobutyronitrile in a mixture with a neutral gas for use as a gas for electrical insulation and/or for electric arc extinction in medium- or high-voltage equipment, in combination with solid insulation, in particular of low dielectric permittivity, that is applied in a thin layer on the conductive parts that are subjected to an electric field that is greater than the breakdown field of the system without solid insulation. Indeed, the medium- or high-voltage equipment of the invention presents some electrical components that are not covered by any solid dielectric layer, and none of the electric components are covered by a solid dielectric layer that is thick as defined in International application WO 2014/037566 [1]. In addition, the composition of the solid dielectric layer is unusual since said layer is made of a material comprising a polyepoxide resin optionally containing a filler, a polyurethane resin optionally containing a filler, or aluminum oxide.

In general, the present invention provides medium- or high-voltage equipment including a leaktight enclosure in which there are located electrical components covered with a solid dielectric layer and a gaseous medium for providing electrical insulation and/or for extinguishing electric arcs that are likely to occur in said enclosure, the gaseous medium comprising heptafluoroisobutyronitrile in a mixture with a dilution gas, the thickness of the solid dielectric layer in said enclosure being less than 1 mm and said solid dielectric layer being made of a material comprising a polyepoxide resin possibly containing a filler, a polyurethane resin possibly containing a filler, or aluminum oxide.

Indeed, the work of the inventors has shown that medium- or high-voltage equipment in which gas insulation is provided by heptafluoroisobutyronitrile is more sensitive to the roughness of the surfaces of electrical components compared to equipment containing $SF_6$ as insulation gas. The inventors have therefore proposed to reduce surface roughness by depositing a thin layer on these electrical components, which thin layer is made of a material based on a polyepoxide or polyurethane resin optionally containing a filler, or aluminum oxide.

Typically, the electrical components covered in a thin layer of such a material are rough cast components.

In addition, the inventors have shown that, performance that is comparable to the performance set out in International application WO 2014/037566 [1] can be obtained while eliminating solid dielectric layers of thickness that is greater than 1 mm, which is synonymous with a reduction in the cost of the medium- or high-voltage equipment.

In a first embodiment, the solid dielectric layer present on the electrical components situated in the leaktight enclosure of high- or medium-voltage equipment of the invention is made of a material comprising or constituted by a polyepoxide resin optionally containing at least one filler or a polyurethane resin optionally containing at least one filler, said layer having a thickness lying in the range 10 to 500 µm.

In this embodiment, the polyepoxide resin of the solid dielectric layer used may comprise or be constituted by a polyepoxide-polysiloxane resin or a polyepoxide-polyester resin.

When the polyepoxide resin or the polyurethane resin includes at least one filler, said filler is present in the form of particles such as nanoparticles. Advantageously, this filler is made of a material selected from the group consisting of alumina, silica, titanium oxide, calcium carbonate, zinc oxide, wollastonite, quartz, graphite, clay, and talc.

In a second embodiment, the solid dielectric layer present on electrical components situated in the leaktight enclosure of high- or medium-voltage equipment of the invention is made of a material comprising aluminum oxide, said layer having a thickness lying in the range 10 to 100 µm.

Advantageously, the solid dielectric layer present at the surface of electric components located in the leaktight enclosure of the medium- or high-voltage equipment of the invention is present in the form of a film or a powder.

The gas insulation in the leaktight enclosure of the medium- or high-voltage equipment of the invention is provided by heptafluoroisobutyronitrile in a mixture with a dilution agent. The latter is advantageously selected from carbon dioxide, nitrogen, oxygen, air, and mixtures thereof.

Advantageously, the medium- or high-voltage equipment of the invention is a gas-insulated electrical transformer, a gas-insulated line for transporting or distributing electricity, an element for connecting to other pieces of equipment in the network, or a connector/disconnector.

The present invention also relates to the use of heptafluoroisobutyronitrile in a mixture with a dilution gas as defined above as gas for electrical insulation and/or for electric arc extinction in medium- or high-voltage equipment having electrical components that are covered with a solid insulating layer of thickness that is less than 1 mm and made of a material as defined above, i.e. comprising a polyepoxide resin optionally containing a filler, a polyurethane resin optionally containing a filler, or aluminum oxide.

DETAILED DESCRIPTION OF PARTICULAR EMBODIMENTS

The invention is based on the use, in medium- or high-voltage equipment, of a hybrid insulation system having low environmental impact, and combining a gas mixture comprising heptafluoroisobutyronitrile with solid insulation having low dielectric permittivity that is applied in a thin layer on the conductive parts that are subjected to an electric field that is greater than the breakdown field of the system without solid insulation.

Above and below, the term "medium voltage" is used in the conventionally accepted manner, i.e. the term "medium voltage" refers to a voltage that is greater than 1000 volts (V) for alternating current (AC) and greater than 1500 V for direct current (DC) but that does not exceed 52,000 V for AC, or 75,000 V for DC.

Above and below, the term "high voltage" is used in the conventionally accepted manner, i.e. the term "high voltage" refers to a voltage that is strictly greater than 52,000 volts for AC and greater than 75,000 V for DC.

Medium- or high-voltage equipment mainly comprises a longitudinal outer casing or enclosure, defining a hollow volume and one or more electrical components that is/are arranged inside said casing.

The inside volume of the casing is closed in gastight manner and is filled by an electrically insulating and electric arc extinction gas that comprises, in the present invention, heptafluoroisobutyronitrile and a dilution gas.

In the present invention, all or some of the electrical components located in the gastight enclosure of the equipment present a dielectric layer on their surfaces.

Indeed, in order to improve overall dielectric strength, the gas mixture comprising heptafluoroisobutyronitrile and a dilution gas is used, in a hybrid insulation system, in combination with solid insulation that is applied as a thin insulating layer on the conductive parts that are subjected to an electric field that is greater than the breakdown field of the system without solid insulation.

The conductive parts covered by this insulating layer are rough cast. In other words, these parts are rough and have not undergone any treatment of the polishing type to modify their surface quality before the insulating layer is deposited.

The solid insulating layer used in the invention presents low relative permittivity. The term "low relative permittivity" refers to relative permittivity that is less than or equal to 6. It should be observed that the relative permittivity of a material, also known as its dielectric constant, which is written $\varepsilon_r$, is a dimensionless quantity that can be defined by the following formulas (I) and (II):

$$\varepsilon_r = \varepsilon/\varepsilon_0 \quad (I)$$

$$\text{with } \varepsilon = (e^*C)/S \text{ and } \varepsilon_0 = 1/(36\pi*10^9) \quad (II)$$

in which:

$\varepsilon$ corresponds to the absolute permittivity of the material (expressed in farads per meter (F/m));

$\varepsilon_0$ corresponds to the permittivity of free space (expressed in F/m);

C corresponds to the capacitance (expressed in farads (F)) of a plane capacitor comprising two parallel electrodes having placed between them a layer of material of permittivity that is to be determined, said layer representing a test piece;

e corresponds to the distance (expressed in meters (m)) between the two parallel electrodes of the plane capacitor, which in this instance corresponds to the thickness of the test piece; and S corresponds to the surface area (expressed in square meters ($m^2$)) of each electrode constituting the plane capacitor.

In the present invention, the capacitance is determined as in IEC standard 60250-ed1.0, i.e. by using a capacitor comprising two circular electrodes of diameter lying in the range 50 mm to 54 mm, secured to the test piece constituted by the material, said electrodes being obtained by spraying a conductive paint with a guard device. The test piece presents dimensions of 100 mm×100 mm and a thickness of 3 mm. The distance between the electrodes of the capacitor, which corresponds to the above-mentioned distance e, is therefore 3 mm.

In addition, the capacitance is determined at an excitation level of 500 volts root mean square (rms), at a frequency of 50 hertz (Hz), at a temperature of 23° C., and relative humidity of 50%. The above-mentioned voltage is applied for a duration of 1 min.

The term "thin solid insulating/dielectric layer" should be understood in the present invention as meaning that the dielectric material, deposited or applied to the electrical components or conductive parts, has a thickness that is less than 1 mm, in particular less than or equal to 750 µm and, in particular less than or equal to 500 µm, whatever the conductive part or portion of conductive part on which it is deposited. In other words, none of the conductive parts in the enclosure of the equipment of the invention present a dielectric layer with a thickness that is greater than or equal to 1 mm. The thickness of the layer is determined during preparation of the elements constituting the equipment.

In the invention, the insulating layer is applied in a thin layer on the conductive parts subjected to an electric field that is greater than the breakdown field of the system without solid insulation. More particularly, the thin dielectric layer is typically deposited on the conductive parts at the place where the utilization factor of the electric field is greater than or equal to 0.2 and in particular greater than or equal to 0.3. It should be recalled that the utilization factor of the electric field, η, is defined as the ratio of the average electric field (U/d) to the maximum electric field, Emax (η=U/(Emax*d)).

The solid insulating layer implemented in the present invention may comprise a single dielectric material or a plurality of different dielectric materials. In addition, the composition of the insulating layer, i.e. the nature of the dielectric material(s) that the layer comprises may differ as a function of the conductive part or the portion of a conductive part on which the solid insulating layer is deposited.

However, in the present invention, the material(s) of the insulating layer include(s) a polyepoxide resin optionally containing a filler, a polyurethane resin optionally containing a filler, or aluminum oxide.

In a first embodiment, the solid dielectric layer present on the electrical components situated in the leaktight enclosure of high- or medium-voltage equipment of the invention is made of a material comprising or constituted by a polyepoxide resin optionally containing at least one filler or a polyurethane resin optionally containing at least one filler, said layer having a thickness lying in the range 10 to 500 µm.

In the present invention, the term "polyepoxide resin" refers to a thermosetting resin obtained from the reaction of identical or different monomers and/or of identical or different oligomers comprising oxirane functional groups (also called epoxy functions) with one or more hardeners, which are typically amines such as a polyamine, amides such as a polyamide, carboxylic acids, or anhydrous acids. In the literature, a polyepoxide resin is also referred to as "epoxy resin" or even "epoxide resin".

The person skilled in the art knows various monomers or oligomers having the epoxy functions that are usable as polyepoxide resin precursors. Such monomers or oligomers correspond in particular to the epoxidised resins described in International application WO 2010/139906 [3] and in patent application EP 1 359 197 [4].

The composition from which the polyepoxide resin is obtained may contain, in addition to one or more different monomers, and/or one or more different oligomers having epoxy functions, and one or more hardeners, at least one other element such as a polysiloxane, a polyester, or a precursor of such polymers. In these situations, the polyepoxide resin will be a polyepoxide-polysiloxane resin or a polyepoxide-polyester resin. Patent application EP 1 359 197 [4] describes several examples of polyepoxide-polysiloxane resin usable in the present invention.

As examples of polyepoxide resins for use in the present invention, mention may be made of Amercoat 385®, Amercoat 4093®, PSX 700®, and Nuklad 105® sold by Ameron.

The term "polyurethane resin" relates to a urethane polymer produced by reacting an isocyanate with a polyol.

The polyepoxide or polyurethane resin deposited on the electric components of the equipment of the invention may be unfilled or filled. When it is filled, the filler may be in the form of particles. The particles implemented in the present invention may be of various shapes, such as spheroidal shapes, ellipsoidal shapes, hexagonal shapes, stick shapes, or in a star configuration. The average particle size distribution of these particles typically lies in the range 10 nm to 1 µm, and in particular in the range 20 to 900 nm. These may therefore be referred to as nanoparticles.

Any filler known to the person skilled in the art may be used in the present invention. However, this filler is not electrically conductive so as to avoid generating any conductive dust. Advantageously, this filler is made of a material selected from the group consisting of alumina, silica, titanium oxide, calcium carbonate, zinc oxide, wollastonite, quartz, graphite, clay, and talc.

The person skilled in the art knows various techniques making it possible to deposit or apply a filled or unfilled polyepoxide or polyurethane resin or a precursor composition of such a resin on the conductive parts of the equipment of the invention. As examples of deposition or application techniques, mention may be made of air spraying with or without compressed air, pneumatic or electrostatic gun spraying, dipping, or cationic electrodeposition (or cataphoresis).

In a second embodiment, the solid dielectric layer present on electrical components situated in the leaktight enclosure of high- or medium-voltage equipment of the invention is made of a material comprising aluminum oxide ($Al_2O_3$ or alumina) or made up of $Al_2O_3$, said layer having a thickness lying in the range 10 to 100 μm.

Advantageously, this solid dielectric layer is produced by subjecting the electrical components that are made of aluminum or that contain an alloy of aluminum to electrolytic oxidation or to cationic oxidation. This technique for passivating an aluminum surface or aluminum alloy surface by depositing a layer of aluminum oxide is well known to the person skilled in the art who knows various types of passivating bath for use with such a treatment such as a sulfuric acid bath or a sulfuric acid and oxalic acid bath.

Advantageously, the solid dielectric layer present at the surface of electric components located in the leaktight enclosure of the medium- or high-voltage equipment of the invention is present in the form of a film or a powder.

Indeed, as a function of the resin or of the precursor composition of said resin, and of the application or cationic oxidation technique that is used, the deposit obtained can be in the form of a powdery or film-forming deposit.

The term "film-forming deposit" refers to a deposit creating a film, once it is applied on the surface of an electrical part, the formation of the film possibly resulting from evaporation of a solvent coexisting in the deposited composition and/or from the chemical transformation in said composition (which transformation may be a polymerization reaction, a polycondensation reaction, a polyaddition reaction, an oxidation reaction, or also a vulcanization reaction).

In the equipment of the present invention, the gas insulation implements a gas mixture including heptafluoroisobutyronitrile.

Heptafluoroisobutyronitrile of formula (III):

$$(CF_3)_2CFCN \quad (III)$$

also referred to as i-$C_3F_7$CN, corresponds to 2,3,3,3-tetrafluoro-2-trifluoromethyl propanenitrile, with CAS registry number: 42532-60-5, presenting a boiling point of −4.7° C. at 1013 hectopascals (hPa) (boiling point measured using ASTM D1120-94 "Standard Test Method of Boiling Point of Engine Coolants").

The relative dielectric strength of heptafluoroisobutyronitrile of formula (III), as normalized relative to $SF_6$, is 2.2, said dielectric strength being measured at atmospheric pressure, with a DC voltage, between two steel electrodes having a diameter of 2.54 centimeters (cm) and spaced apart by 0.1 cm.

Thus, heptafluoroisobutyronitrile of formula (III) as described above, that is non-toxic, non-corrosive, non-flammable, and that presents a GWP that is low compared with that of $SF_6$, is endowed with electrical insulation or electric arc extinction properties suitable for enabling it in combination with a dilution gas to replace $SF_6$ as an insulation gas and/or arc-extinction gas in medium- or high-voltage equipment.

The mixture used in the present invention comprises heptafluoroisobutyronitrile and a dilution gas. The dilution gas is also known as "mixing gas" or "carrier gas".

In the invention, heptafluoroisobutyronitrile of formula (III) as defined above is used in a mixture with a dilution gas that is selected from gases that meet the following four criteria:

(1) presenting a very low boiling temperature, lower than the minimum utilization temperature of the equipment;

(2) presenting dielectric strength that is greater than or equal to that of carbon dioxide in test conditions that are identical to those used for measuring the dielectric strength of said carbon dioxide (i.e. same equipment, same geometrical configuration, same operating parameters, . . . );

(3) being free from toxicity for humans and animals; and (4) presenting a GWP that is lower than that of heptafluoroisobutyronitrile so that diluting heptafluoroisobutyronitrile with the dilution gas also has the effect of lowering the environmental impact of heptafluoroisobutyronitrile, since the GWP of a gas mixture is a weighted average derived from the sum of the fractions by weight of each of the substances making it up multiplied by the corresponding GWPs.

In particular, a dilution gas for use in the present invention is a neutral gas having a GWP that is very low, or even zero. Thus, the dilution gas is, typically, carbon dioxide, having a GWP that is equal to 1, nitrogen, oxygen, or air, advantageously dry air, having a GWP that is equal to 0, or mixtures thereof. More particularly, a dilution gas usable in the present invention is selected from among carbon dioxide, nitrogen, oxygen, air, advantageously dry air, and mixtures thereof.

Advantageously, heptafluoroisobutyronitrile as defined above is present in the heptafluoroisobutyronitrile/dilution gas mixture at a molar percentage ($M_{he}$) that is not less than 80% of the molar percentage M, determined by the formula (IV):

$$M=(P_{he}/P_{mixture})\times 100 \quad (IV)$$

in which $P_{mixture}$ represents the total pressure of the mixture at 20° C. in the equipment and $P_{he}$ represents the partial pressure, expressed in the same units, that is equivalent at 20° C. to the saturated vapor pressure presented by heptafluoroisobutyronitrile as defined above at the minimum utilization temperature of the equipment.

As for the pressure $P_{he}$, it is approximated by the formula (V):

$$P_{he}=(SVP_{he}\times 293)/(T_{min}+273) \quad (V)$$

in which $SVP_{he}$ represents the saturated vapor pressure of heptafluoroisobutyronitrile as defined above at the minimum utilization temperature $T_{min}$ of the equipment, expressed in degrees Celsius.

Thus, the dielectric properties of the gaseous medium are the highest possible and are close to those of $SF_6$.

Advantageously, in the present invention, the minimum utilization temperature $T_{min}$ is selected from 0° C., −5° C., −10° C., −15° C., −20° C., −25° C., −30° C., −35° C., −40° C., −45° C., and −50° C., and, in particular, it is selected from 0° C., −5° C., −10° C., −15° C., −20° C., −25° C., −30° C., −35° C., and −40° C.

In a first embodiment, the equipment is medium- or high-voltage equipment in which having some of the mixture in the liquid state does not reduce insulation. In this event, it is possible to use a mixture in which heptafluoroisobutyronitrile is present in a molar percentage $M_{he}$, that is greater than the molar percentage M. In which event, the molar percentage of heptafluoroisobutyronitrile typically lies in the range 95% to 130%, better still in the range 97% to 120%, and ideally in the range 99% to 110% of the molar percentage M as defined above. Under such circumstances, the dielectric strength of the equipment should be tested with heptafluoroisobutyronitrile in the gas mixture at a partial pressure for which the gas does not present liquefaction at the minimum service temperature so that the dielectric strength of said equipment is validated across the whole of its temperature range.

In a second embodiment, the equipment is medium- or high-voltage equipment in which insulation can be affected by the presence of a liquid phase. In this embodiment, it is desirable for the mixture of heptafluoroisobutyronitrile and dilution gas to be exclusively or almost exclusively in the gaseous state across the entire range of utilization temperatures for the equipment. It is therefore advantageous for heptafluoroisobutyronitrile to be present in the mixture at a molar percentage ($M_{he}$) that does not exceed 100% of the molar percentage M so that it does not present a liquefaction phase at the minimum utilization temperature. Under such circumstances, the molar percentage of heptafluoroisobutyronitrile advantageously lies in the range 95% to 100% and, in particular, in the range 98% to 100% of the molar percentage M as defined above.

By way of particular example, the gas mixture used in the present invention may contain only heptafluoroisobutyronitrile and carbon dioxide and may therefore be constituted by these two compounds only. In this event, the gas mixture comprises a molar percentage of 2% to 15% of heptafluoroisobutyronitrile and a molar percentage of 85% to 98% of carbon dioxide and, in particular, a molar percentage of 4% to 10% of heptafluoro-isobutyronitrile and a molar percentage of 90% to 96% carbon dioxide.

In a variant, this gas mixture may contain at least one other element in addition to heptafluoroisobutyronitrile and carbon dioxide. This other element may be any compound that is usually used for insulating high- or medium-voltage electrical equipment. Advantageously, such a compound is selected from nitrogen, oxygen, air, advantageously dry air, and mixtures thereof. Typically, this other element is oxygen.

In this variant, the gas mixture comprises a molar percentage in the range 2% to 15% of heptafluoroisobutyronitrile, 70% to 97% of carbon dioxide, and 1% to 15% of at least one other element as defined above, and in particular in the range 1% to 15% oxygen. In particular, the gas mixture comprises a molar percentage in the range 4% to 10% of heptafluoroisobutyronitrile, 80% to 94% of carbon dioxide, and 2% to 10% of at least one other element as defined above, and in particular in the range 2% to 10% oxygen.

Advantageously, heptafluoroisobutyronitrile is present in the equipment in entirely gaseous form whatever the utilization temperature of the equipment. It is therefore advisable for the pressure of h heptafluoroisobutyronitrile inside the equipment to be selected as a function of the saturated vapor pressure (SVP) presented by heptafluoroisobutyronitrile at the lowest utilization temperature of said equipment.

However, since equipment is usually filled with gas at ambient temperature, the pressure of heptafluoroisobutyronitrile to which reference is made for filling the equipment is the pressure that corresponds, at the filling temperature, e.g. 20° C., to the SVP presented by heptafluoroisobutyronitrile at the lowest utilization temperature of said equipment.

By way of example, Table I below gives the saturated vapor pressures, referenced $SVP_{i-C3F7CN}$ and expressed in hectopascals, presented by heptafluoroisobutyronitrile at temperatures of 0° C., −5° C., −10° C., −15° C., −20° C., −25° C., −30° C., and −40° C., together with the pressures, referenced $P_{i-C3F7CN}$ and expressed in hectopascals, that correspond at 20° C. to those saturated vapor pressures.

TABLE I saturated vapor pressures of i-$C_3F_7$CN

| Temperatures | $SVP_{i-C3F7CN}$ (hPa) | $P_{i-C3F7CN}$ (hPa) |
|---|---|---|
| 0° C. | 1177 | 1264 |
| −5° C. | 968 | 1058 |
| −10° C. | 788 | 877 |
| −15° C. | 634 | 720 |
| −20° C. | 504 | 583 |
| −25° C. | 395 | 466 |
| −30° C. | 305 | 368 |
| −35° C. | 232 | 286 |
| −40° C. | 173 | 218 |

In accordance with the invention, the equipment may be, firstly, a gas-insulated electrical transformer, e.g. a power transformer or a measurement transformer.

It may also be an overhead or buried gas-insulated line, or a set of busbars for transporting or distributing electricity.

There may also be an element for connection to the other equipment in the network, e.g. overhead lines or partition bushings.

Finally, it may also be a connector/disconnector (also called switchgear) such as, for example, a circuit breaker, a switch, a disconnector, a unit combining a switch with fuses, a grounding switch, or a contactor.

Example of Application and Filling

Depending on the equipment, the recommended pressure for filling with a medium for electrical insulation and/or electric arc extinction varies. However, it is typically several bars (i.e. several thousand hectopascals).

Heptafluoroisobutyronitrile is used in a mixture with carbon dioxide in order to be able to obtain the recommended filling pressure level.

Thus, for example, equipment designed firstly for being used at a minimum temperature of −30° C., and secondly for being filled to 9.2 bars (i.e. 9 200 hPa), is filled with 0.368 bars (i.e. 368 hPa) of heptafluoroisobutyronitrile and 8.832 bars (i.e. 8832 hPa) of carbon dioxide.

Such equipment is in particular 420 kV GIB equipment from Alstom designed for use at −30° C. filled with $CO_2$/i-$C_3F_7$CN. For this equipment with a minimum utilization temperature of −30° C., heptafluoroisobutyronitrile should be at a pressure of 0.368 bars absolute when measured at 20° C. Additional $CO_2$ should be added in order to obtain the final properties of the gas mixture. Since the partial pressure of heptafluoroisobutyronitrile is 0.368 bars absolute measured at 20° C. and the total pressure of the gas is 5 bars absolute, the molar ratio of i-$C_3F_7$CN is thus 0.368/5, i.e. about 7.4%.

In order to determine the composition of the gas mixture during filling, the molar percentage M of heptafluoroisobutyronitrile at the recommended filling pressure for the equipment is determined, which percentage represents the maximum proportion of heptafluoroisobutyronitrile that the heptafluoroisobutyronitrile/$CO_2$ mixture can contain in order to ensure that there is no liquid in the enclosure of the equipment. The molar percentage M is given by the formula $M = (P_{he}/P_{mixture}) \times 100$, with $P_{he}$ representing the pressure that is equivalent, at the filling temperature (typically of the order of 20° C.), to the saturated vapor pressure SVP of heptafluoroisobutyronitrile at the minimum utilization temperature $T_{min}$ of the equipment ($P_{he} = (SVP_{he} \times 293)/(273 + T_{min})$).

Then, the molar percentage $M_{he}$ for filling is selected as a function of M. In some circumstances, it is imperative that $M_{he}$ does not exceed M in order to avoid the presence of any liquid.

However, it is sometimes possible, e.g. at medium voltage or for some high-voltage equipment having insulation that is unaffected by the presence of a liquid phase, to have a small amount of liquid at low or very low temperature, in which event $M_{he}$ may reach 110% or even 130% of M. In addition, since heptafluoroisobutyronitrile has better dielectric strength than neutral gases, it is desirable to optimize filling with heptafluoroisobutyronitrile: therefore, it is preferably to select $M_{he}$ so that it is greater than or equal to 80% of M, more preferably greater than or equal to 95% of M, still more preferably greater than or equal to 98% of M, e.g. equal to 99% of M.

The equipment is filled by means of a gas mixer making it possible to control the ratio between heptafluoroisobutyronitrile and carbon dioxide, this ratio being held constant and equal to about 7.4% by pressure throughout filling by using a precision mass flowmeter.

Association with Solid Insulation

In order to obtain dielectric equivalence with $SF_6$, without reducing its performance at low temperature or increasing the total amount of pressure, the gaseous mixture presented above is used in combination with solid insulation having low dielectric permittivity, which solid insulation is applied on those conductive parts that are subjected to an electric field that is greater than the breakdown field of the system without solid insulation.

In the present invention, three kinds of solid insulation have been tested:

a powder coating of a thermosetting resin of the epoxide type according to DIN EN ISO 12944 D5M with a thickness of 100 µm;

an aluminum oxide coating obtained by hard anodizing by passing electric current through an acid bath, with a thickness of about 50 µm; and a white epoxide paint with a thickness lying in the range 100 and 400 µm.

Those three coatings were applied to casings and to aluminum parts obtained by rough casting, specifically by sand casting without additional surface treatments, of the polishing type before depositing the coating.

The dielectric strength under a lightning impact is 650 kV on an uncoated rough cast part. The parts coated with the three above-described coatings show an improvement in their lightning impact strength of the order of 50 kV, i.e. an improvement of 7.6% relative to the rough cast parts. In comparison, a part that is not rough cast but that has been deburred presents an improvement in dielectric strength under lightning impact of 25 kV.

The positive influence of the surface treatment is particularly remarkable when surfaces of the parts are rough cast and present substantial roughness. Thus, the surface treatment of the invention, i.e. deposition of a solid coating, contributes to smoothing the part. For polished parts of low roughness, the addition of a coating does not significantly improve the overall dielectric strength.

REFERENCES

[1] International application WO 2014/037566, in the name of Alstom Technology Ltd, published on Mar. 13, 2014.

[2] International application WO 2015/040069, in the name of Alstom Technology Ltd, published on Mar. 26, 2015.

[3] International application WO 2010/139906, in the name of Arkema France, published on Dec. 9, 2010.

[4] Patent application EP 1 359 197, in the name of SigmaKalon Group, published on Nov. 5, 2003.

What is claimed is:

1. A Medium- or high-voltage equipment comprising:
a leak tight enclosure including a gaseous medium, the gaseous medium comprising at least heptafluoroisobutyronitrile in a mixture with a dilution gas; and
electrical components located in the leak tight enclosure, at least one surface of the electrical components having a sand cast surface finish, the at least one surface of the electrical components including a solid dielectric layer to reduce a surface roughness of the sand cast surface finish of the at least one surface,
wherein a thickness of the solid dielectric layer is less than 1 mm, and
wherein a utilization factor of an electric field generated by the electrical components is greater than or equal to 0.2, the utilization factor being a ratio of a mean electric field divided by a maximum electric field, and
wherein the solid dielectric layer is made of a material comprising a polyepoxide resin, a polyurethane resin, or aluminum oxide.

2. The medium- or high-voltage equipment according to claim 1, wherein said solid dielectric layer has a thickness lying in a range of 10 to 500 µm.

3. The medium- or high-voltage equipment according to claim 1, wherein said polyepoxide resin comprises or is constituted by a polyepoxide-polysiloxane resin or a polyepoxide-polyester resin.

4. The medium- or high-voltage equipment according to claim 1, wherein the material comprises the polyepoxide resin and the polyepoxide resin comprises a filler.

5. The medium- or high-voltage equipment according to claim 4, wherein said filler is made of a material selected from the group consisting of alumina, silica, titanium oxide, calcium carbonate, zinc oxide, wollastonite, quartz, graphite, clay, and talc.

6. The medium- or high-voltage equipment according to claim 1, wherein said solid dielectric layer has a thickness lying in a range of 10 and 100 µm.

7. The medium- or high-voltage equipment according to claim 1, wherein the material comprises the polyurethane resin and the polyurethane resin comprises a filler.

8. The medium- or high-voltage equipment according to claim 1, wherein said dilution gas is selected from carbon dioxide, nitrogen, oxygen, air, and mixtures thereof.

9. The medium- or high-voltage equipment according to claim 1, wherein said equipment is a gas-insulated electrical transformer, a gas-insulated line for transporting or distributing electricity, an element for connecting to other pieces of equipment in a network, or a connector/disconnector.

10. The medium- or high-voltage equipment according to a claim 1, wherein said solid dielectric layer comprises a film or a powder.

11. The medium- or high-voltage equipment according to claim 4, wherein the filler comprises nanoparticles.

12. A method for extinguishing an electrical arc in medium- or high-voltage equipment, the method comprising:
providing a gaseous medium to a medium- or high-voltage equipment including a solid dielectric layer, the gaseous medium comprising a mixture including at least a dilution gas and heptafluoroisobutyronitrile, wherein the medium- or high-voltage equipment includes electrical components located in a leak tight enclosure, at least one surface of the electrical components having a sand cast surface finish, the at least one surface of the electrical components including a solid dielectric layer to reduce a surface roughness of the sand cast surface finish of the at least one surface, wherein a thickness of the solid dielectric layer is less than 1 mm, and wherein a utilization factor of an electric field generated by the electrical components is greater than or equal to 0.2, the utilization factor being a ratio of a mean electric field divided by a maximum electric field.

* * * * *